United States Patent

[11] 3,632,960

[72] Inventors: Friedrich Erdmann-Jesnitzer, Hannover-Wettbergen; Dietrich Rehfeldt, Vinnhorst/Hannover, both of Germany
[21] Appl. No. 803,663
[22] Filed Mar. 3, 1969
[45] Patented Jan. 4, 1972
[73] Assignee Redemat S.A. Holding Luxembourg, Grand Duchy, Luxembourg
[32] Priority Mar. 1, 1968
[33] Germany
[31] P 16 90 562.7

[54] APPARATUS FOR MONITORING, CONTROLLING AND REGULATING ELECTRIC WELDING PROCESSES
11 Claims, 3 Drawing Figs.

[52] U.S. Cl............................................ 219/131 R,
219/137
[51] Int. Cl............................................ B23k 9/10
[50] Field of Search............................ 219/131, 137, 110

[56] References Cited
UNITED STATES PATENTS
3,250,894 5/1966 Manz.................... 219/131 R
3,191,441 6/1965 Erickson................ 219/110 X
3,346,716 10/1967 Broomhall............. 219/110

Primary Examiner—C. L. Albritton
Attorney—John J. Dennemeyer

ABSTRACT: An electronic method and apparatus for monitoring, controlling and regulating the welding operation in electric welding by determining the absolute frequency of at least one stochastic variable of a welding parameter, determining a reference curve of the absolute frequency with respect to quality and economy of the weld, and comparing the actual frequency curve with the desired frequency curve during the welding operation. When deviations are sensed these are signaled and a control intervenes in the welding operation to reduce the deviations. The places on the seam where the deviations occur are marked in a suitable manner.

APPARATUS FOR MONITORING, CONTROLLING AND REGULATING ELECTRIC WELDING PROCESSES

BACKGROUND OF THE INVENTION

1. Field of Art

The subject invention concerns electric welding, especially a method and apparatus for monitoring, controlling, and regulating the operation in electric welding processes, especially electric arc-welding and electric slag-welding processes with a consumable electrode.

2. Description of Prior Art

It is known that the electrode filler material in electric arc-welding and electric slag-welding processes melts off in the form of drops or in a similar form and that during the melting and transition of the drops with or without short circuits characteristic welding voltage variations occur. This is described for example in German Pat. No. 828,571. Accordingly there is a fixed relation between determined pulse-shaped welding voltage variations of sufficient magnitude and the transition of molten electrode filler material for welding operation parameters specifically adjusted with respect to the filler material, such welding operation parameters comprising the welding voltage and the welding current, the electric arc length, the electrode or wire inclination, etc.

If one classifies these pulse-shaped welding voltage variations, caused by the above-mentioned transition of the drop with respect to their duration below or above a suitable preset threshold voltage, or with respect to other features such as for example the position of the relative extreme values or the momentary values, one obtains for all electric welding processes with consumable electrode filler material characteristic distribution curves.

In case for the base material and the electrode filler material the optimal desired distribution curves with respect to the quality and the power are known through prior tests for the different welding methods and welding operation parameters, one can monitor by determining the distribution curve during a welding operation to be performed on the one hand the melting behavior and also, if desired, intervene by control or regulation in the welding process and influence it in a favorable manner.

So far no method has become known for picking up this so-called absolute frequency distribution of features of the welding voltage variations while a welding operation takes place. Usually during the welding operation only the curve of the welding voltage is recorded by means of a suitable oscillograph and subsequent to the welding and measuring one determines as a useful feature for the registered welding voltage short circuits by measuring on the oscillogram the duration or the interval of the short circuits; this feature is collected in feature classes and represented as absolute frequency distribution of the short circuit period or the heating-up period in the form of a histogram.

In the Journal "Werkstatt und Betrieb," 100, (1967), book 100 pages 785–789, Stromberger and Eibeck described an electronic device for determining the so-called cumulative frequency distribution of the short circuit period of the welding voltage during welding. From the class values of the cumulative frequency distribution thus determined one calculates after the welding and the measurement the absolute frequency distribution of the short circuit period by subtraction of two subsequent class values.

These two methods known today thus allow only the determination of the absolute frequency distribution of the short circuit period and of the heating-up period or in the second case only of the short circuit period after a time-consuming evaluation. Due to the time interval between the measurement and the availability of the test results, namely of the absolute frequency distribution in the form of test records or of a histogram, both methods do not allow to eliminate immediately after the occurrence of a disturbance, e.g. in the consumption behavior of the electrode filler material the existing disturbance by a suitable control or regulating device.

Furthermore a classification restricted one feature, e.g. to the short circuit period, is not very significant when, as it is the case for medium- to fine-drop electrodes, on the basis of their special transition characteristics, their drop transition occurs without a short circuit and more or less in the form of sparks.

SUMMARY OF THE INVENTION

The object of the present invention is to provide a novel method which allows to determine immediately during welding the absolute frequency distributions of determined amplitude or time features of the welding voltage or current, to compare these distributions with so-called desired distributions and to signal the disturbance in case of unduly large deviations from these known desired distributions, while it is also possible to control the disturbance by means of a suitable control device in the welding apparatus.

According to the invention this object is solved by electronically determining the absolute frequency of at least one stochastic variable of a welding parameter, especially of the pulse duration of electric arc voltage breakdowns, electronically determining a desired reference curve of the absolute frequency of the tested variable or variables with respect to the quality and the economy of the welding, and electronically comparing the absolute frequency with the desired reference curve during the welding process.

By means of a preferably digital electronic switching circuitry one can thus rate the analog welding voltage or current and classify the corresponding characteristic features (stochastic variables), such as preferably the short circuit period, the heating-up period, the position of the relative extreme values and the momentary values according to their magnitude. The individual features falling within one feature class are electronically summed up and their number is stored as class value.

The method according to the invention further allows to determine during the comparison the deviations of the absolute frequency curve from the desired curve and to signal it e.g. electrically, electromechanically, optically or acoustically.

The method also allows to intervene in the welding process during the comparison of the deviations of the absolute frequency curve from the desired curve in a manner controlling or regulating the deviation so as to decrease it, as well as to automatically mark the particular point of the weld seam.

The device for carrying out the method according to the invention comprises an analog-digital transducer controlled by the welding parameters, a classifier controlled by the transformed welding parameter, a class value storage unit and a device for indicating or recording the class values.

The device according to the invention comprises in a further embodiment a comparator comparing the class values stored in the class value storage unit with the programmed desired (limit) values and a marker which is controlled by the comparator when the desired value is lower or higher.

The welding machine is provided also with a regulator device which is controlled by the comparator in order to regulate the deviations.

As marker may be used either a laser beam directed on or adjacent the weld seam and producing a penetration mark on the workpiece, or a tape recorder device running synchronously with the length of the weld seam.

As an indicating or recording device, a rapid printer or an XY-recorder may be used.

The foregoing and other objects, features and advantages of the present invention will become more apparent in the light of the following detailed description of a preferred embodiment thereof, as illustrated in the accompanying drawings.

DESCRIPTION OF THE PREFERRED EMBODIMENTS

Figure 1:
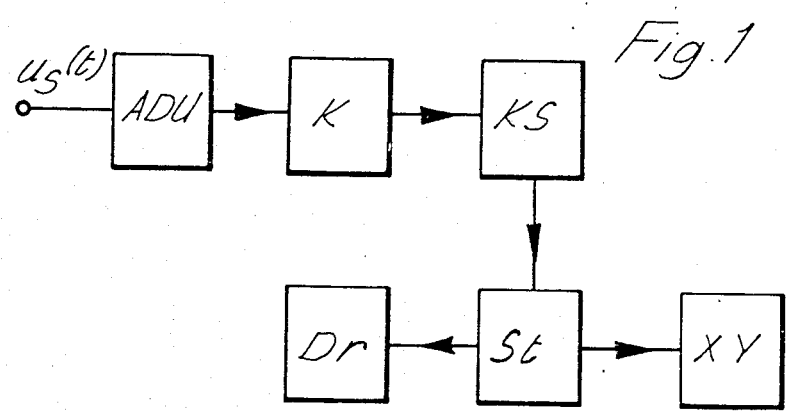
FIG. 1 is a block diagram of an embodiment of the apparatus according to the invention.

Reference is now made to FIG. 1 which represents a preferred embodiment of the apparatus according to the invention. By means of an analog-digital transducer "ADU" the analog welding voltage $u_s(t)$ is transformed into a digital information, in the classifier "K" the digital information is classified according to the desired features and the number of incidents per class feature is summed up and stored in the class value storage unit "KS." After the measurement the class value storage units are interrogated by means of a printer or XY-recorder control "ST" and the stored information in printed by means of the printer "Dr" and/or recorded by means of the XY-recorder "XY" in the form of a histogram.

By means of this apparatus it is possible to determine the absolute frequency distribution of the short circuit duration, of the heating-up duration, of the position of the relative extreme values and of the temporary values, i.e. of the amplitude density distribution thus immediately determine during the welding measurement values that are of interest and to represent these values subsequent to the measurement in the form of printed test records and/or as histogram; a special application, respectively a practical utilization exists for example in the research of the melting behavior of filler material, also in an inert gas atmosphere, and of the welding characteristics of welding devices with or without controlled or regulated variation of the inert gas, and thus in all corresponding development work due to the advantage of this quick determination and evaluation of the test results.

Figure 2:
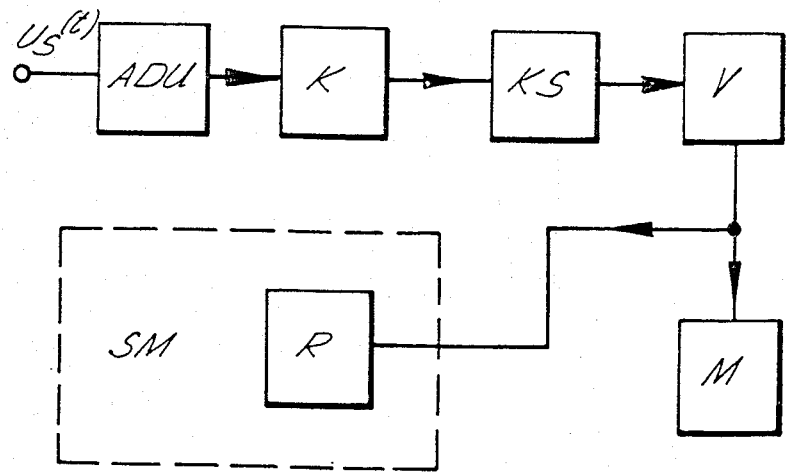
FIG. 2 is a block diagram of a further embodiment of this apparatus.

A further embodiment of the apparatus according to the invention is shown in FIG. 2. This embodiment is an expanded arrangement of that shown in FIG. 1 and allows a comparison of the limit values of the class values or absolute frequency distributions with desired values or desired value distributions.

In the comparator "V" the class values which are stored in the storage units "KS" are compared with the programmed limit values and when they are above or below the limit value an electrical signal is fed to the marker "M," this signal causing by means of the marker "M" the marking, preferably of the weld seam, and/or signals the deviating welding behavior. The electrical signal may also be used to adjust by means of a suitable control device "R" in the welding machine "SM" the deviating welding behavior, or to set the optimum position.

Figure 3:
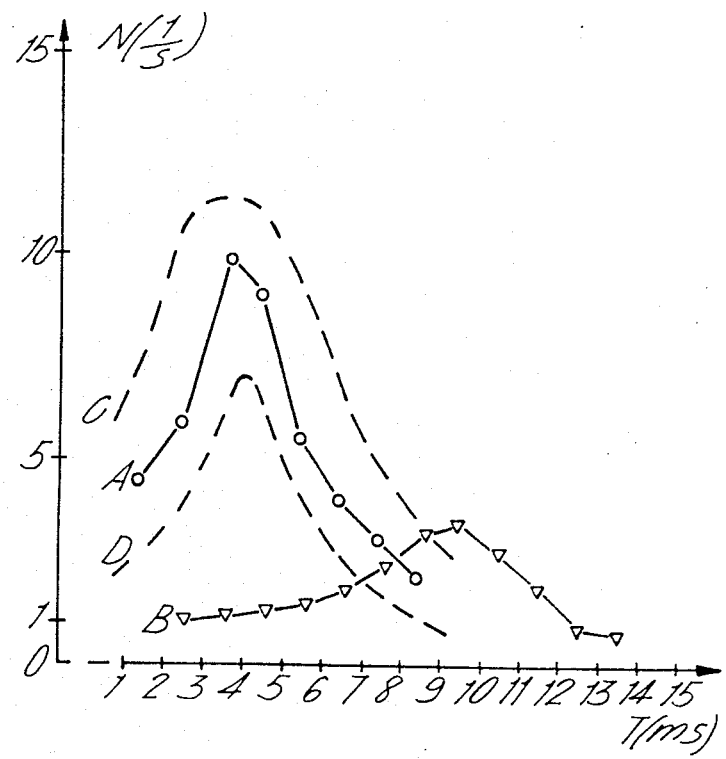
FIG. 3 shows two typical distribution curves of the short circuit duration which were recorded with the apparatus according to the invention.

In FIG. 3 are shown two typical distribution curves of the short circuit duration which were recorded during automatic inert gas welding under $CO_2$. The distribution curve A shows an optimum desired distribution for a given welding device for a welding voltage of $U_s=+19$ v., a welding current of $I_s=200$ a. and a wire diameter $d=1.6$ mm. On the ordinate are indicated the class values as short circuit number per second, on the abscissa the class limits are indicated in milliseconds.

The apparatus shown in FIG. 2 is especially suited for quality control and for automatic monitoring in the production of the welding electrodes and welding machines, because an inadmissible deviation from the required minimum quality may be indicated by the "yes-no" information of the marker. Furthermore this method and the apparatus can advantageously be used in the monitoring of the welding operation for weld seams and in some cases in the examination costs for welds subject to acceptance can be decreased by the direct monitoring immediately during the welding because from experience the probability of a fault and thereby of the failure of weld seams which have been welded with a welding behavior deviating from optimum is substantially greater than that of weld seams which have been welded under optimum conditions.

The automatic control or regulation of the welding operation by an adjustment of the welding machine on the basis of the deviation from the desired distribution of the absolute frequency produces a new regulation method with respect to the known methods which provide a control of the welding machine adjustment on the basis of a deviation from the desired welding voltage or current. The advantage of the novel method described in this application consists in that the dynamic welding voltage curve is used together with the welding voltage variations which are characteristic for the transition of the material as input value for the regulation circuit and not, as in the known methods, only the mean value of the welding voltage or current.

The distribution curve B is the distribution curve which strongly differs from the optimal desired distribution curve A for an excessive welding current $I_s=250$ a. which was caused by an excessive wire feed speed. By means of a regulating device in the welding machine the welding current can again be so adjusted that the distribution curve lies again within the limit distribution curves C and D.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

Having thus described typical embodiments of the invention, that which is claimed as new and to be secured by Letters Patent of the United States is:

1. Apparatus for monitoring, controlling and regulating a welding operation in welding a weld seam in an electric welding process, especially electric arc welding and electroslag welding having at least one consumable electrode, comprising:
   an analog-digital transducer means driven by a welding parameter for producing at its output digital signals commensurate with the welding parameter;
   classifier means receiving at its input the digital signals from the output of the transducer means for classifying the digital signals into classes according to desired features for producing second signals commensurate therewith;
   class value storage means receiving at its input said second signals for counting and storing said second signals; and
   means connected to said class value storage means for displaying and recording the second signals stored in the class value storage means.

2. The apparatus according to claim 1, further including:
   comparator means receiving the second signals stored in the class value storage means for comparing the class values with predetermined desired limit values; and
   means connected to an output of the comparator means for marking a weld seam when the actual class value deviates from the predetermined desired limit values.

3. The apparatus of claim 2, comprising
   control means connected to the output of the comparator means for controlling a welding operation to match the actual class value with the predetermined desired limit values.

4. The apparatus of claim 3, wherein a laser beam directed adjacent the weld seam is used as the marking means to produce a penetration mark adjacent the weld seam.

5. The apparatus of claim 3, wherein the marking means is a tape recording device running synchronously with the weld seam as it progresses.

6. The apparatus of claim 1, wherein a printer is the displaying and recording means.

7. The apparatus of claim 1, wherein an XY-recorder is used as the displaying and recording means.

8. Apparatus for monitoring, controlling and regulating a welding operation in welding a weld seam in an electric welding process, especially electric arc welding and electroslag welding having at least one consumable electrode, comprising
   an analog-digital transducer means driven by a welding parameter for producing at its output digital signals commensurate with the welding parameter;
   classifier means receiving at its input the digital signals from the output of the transducer means for classifying the digital signals into classes according to desired features for producing second signals commensurate therewith;

class value storage means receiving at its input said second signals for counting and storing said second signals;

means connected to said class value storage means for displaying and recording the second signals stored in the class value storage means;

comparator means receiving the second signals stored in the class value storage means for comparing the class values with programmed desired limit values; and means connected to an output of the comparator means for making a weld seam when the actual class value deviates from the desired limit values.

9. The apparatus of claim 8, wherein a laser beam directed adjacent the weld seam is used as the marking means to produce a penetration mark adjacent the weld seam.

10. The apparatus of claim 8, wherein the marking means is a tape recording device running synchronously with the weld seam as it progresses.

11. Apparatus for monitoring, controlling and regulating a welding operation in welding a weld seam in an electric welding process, especially electric arc welding and electroslag welding with at least one consumable electrode, comprising an analog-digital transducer means driven by a welding parameter for producing at its output digital signals commensurate with the welding parameter;

classifier means receiving at its input the digital signals from the output of the transducer means for classifying the digital signals into classes according to desired features for producing second signals commensurate therewith;

class value storage means receiving at its input said second signals for counting and storing said second signals;

means connected to said class value storage means for displaying and recording the second signals stored in the class value storage means;

comparator means receiving the second signals stored in the class value storage means for comparing the class values with programmed desired limit values;

means connected to an output of the comparator means for marking a weld seam when the actual class value deviates from the desired limit values; and control means connected to the output of the comparator means for controlling a welding operation to match the actual class value with the desired limit values.

* * * * *